US008326675B2

(12) United States Patent
Doshi et al.

(10) Patent No.: US 8,326,675 B2
(45) Date of Patent: *Dec. 4, 2012

(54) METHOD AND SYSTEM FOR LOAD BALANCING A SALES FORECAST BY SELECTING A SYNCHRONOUS OR ASYNCHRONOUS PROCESS BASED ON A TYPE OF EVENT AFFECTING THE SALES FORECAST

(75) Inventors: Kedar Doshi, Palo Alto, CA (US); Mark Fischer, Ashland, OR (US); Evan Chou, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/353,265

(22) Filed: Jan. 18, 2012

(65) Prior Publication Data

US 2012/0117014 A1 May 10, 2012

Related U.S. Application Data

(63) Continuation of application No. 11/832,526, filed on Aug. 1, 2007, now Pat. No. 8,131,580.

(60) Provisional application No. 60/828,188, filed on Oct. 4, 2006.

(51) Int. Cl.
*G06Q 10/00* (2012.01)
*G06Q 30/00* (2012.01)

(52) U.S. Cl. ..................... 705/7.31
(58) Field of Classification Search .................. 705/7.31
See application file for complete search history.

(56) References Cited

U.S. PATENT DOCUMENTS

| 4,403,286 | A | * | 9/1983 | Fry et al. ........................ 718/105 |
| 4,633,387 | A | * | 12/1986 | Hartung et al. ............... 718/105 |
| 6,292,822 | B1 | * | 9/2001 | Hardwick ..................... 718/105 |
| 6,374,297 | B1 | * | 4/2002 | Wolf et al. .................... 709/226 |
| 6,609,101 | B1 | | 8/2003 | Landvater |
| 6,804,657 | B1 | * | 10/2004 | Sultan ........................... 705/7.31 |
| 7,080,026 | B2 | * | 7/2006 | Singh et al. ................... 705/7.31 |
| 7,516,084 | B1 | * | 4/2009 | Sankaran et al. ............. 705/7.31 |
| 7,664,671 | B2 | * | 2/2010 | Shan ............................. 705/7.11 |
| 7,769,802 | B2 | * | 8/2010 | Smith et al. ................... 709/201 |
| 7,797,182 | B2 | * | 9/2010 | Lindquist et al. ............. 705/7.31 |
| 7,822,630 | B1 | * | 10/2010 | Smyth et al. .................. 705/7.31 |
| 7,934,216 | B2 | * | 4/2011 | Taylor et al. .................. 718/105 |
| 2005/0102175 | A1 | * | 5/2005 | Dudat et al. ..................... 705/10 |
| 2005/0165635 | A1 | | 7/2005 | Moessner |
| 2006/0034460 | A1 | * | 2/2006 | Huberman et al. ........... 380/277 |
| 2008/0086358 | A1 | * | 4/2008 | Doshi et al. ..................... 705/10 |
| 2008/0243867 | A1 | * | 10/2008 | Janedittakarn et al. ......... 707/10 |
| 2009/0328050 | A1 | * | 12/2009 | Liu et al. ....................... 718/104 |
| 2011/0231848 | A1 | * | 9/2011 | Long et al. .................... 718/101 |

OTHER PUBLICATIONS

Wong, T.,, "Salesforce.com for Dummies," Wiley Publishing, Jan. 2005, pp. 25, 73, 75, 121, 122, 171, 173, 178, 179, 195-199, 202, 204-207, 320, and 321. Non-Final Office Action from U.S. Appl. No. 13/353,260, dated Mar. 6, 2012.
Notice of Allowance from U.S. Appl. No. 13/353,260, dated Jul. 23, 2012.

* cited by examiner

*Primary Examiner* — Scott L Jarrett
(74) *Attorney, Agent, or Firm* — Zilka-Kotab, PC

(57) ABSTRACT

In accordance with embodiments, there are provided mechanisms and methods for selecting a synchronous or asynchronous process to determine a forecast. These mechanisms and methods for such synchronous/asynchronous process selection can enable embodiments to determine forecasts for multiple users (e.g. with hierarchical relationships, etc.) over an arbitrary time interval. The ability of embodiments to provide forecasts that involve such a large amount of data in an effective way can enable forecasting that was otherwise infeasible due to resource limitations.

24 Claims, 7 Drawing Sheets

METHOD AND SYSTEM FOR LOAD BALANCING A SALES FORECAST BY SELECTING A SYNCHRONOUS OR ASYNCHRONOUS PROCESS BASED ON A TYPE OF EVENT AFFECTING THE SALES FORECAST

CLAIM OF PRIORITY

This application is a continuation of U.S. application Ser. No. 11/832,526, filed Aug. 1, 2007, which claims the benefit of U.S. Provisional Patent Application 60/828,188 entitled "Method And System For Synchronous-Asynchronous Event Based Forecasting Over Arbitrary Time Intervals," by Doshi et al., filed Oct. 4, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to determining a forecast in a database network system.

BACKGROUND

The subject matter discussed in the background section should not be assumed to be prior on merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

One illustrative use of the foregoing database systems involves the determination of a forecast. One example of a forecast is a sales forecast involving a predication of an amount of sales a salesperson will have in a given amount of time. To date, such forecasts have been determined only for a single person over a predetermined time interval. Unfortunately, any attempt to do otherwise would result in a large amount of data that may be difficult to process. There is thus a need for addressing these and/or other issues.

BRIEF SUMMARY

In accordance with embodiments, there are provided mechanisms and methods for selecting a synchronous or asynchronous process to determine a forecast. These mechanisms and methods for such synchronous/asynchronous process selection can enable embodiments to determine forecasts for multiple users (e.g. with hierarchical relationships, etc.) over an arbitrary time interval. The ability of embodiments to provide forecasts that involve such a large amount of data in an effective way can enable forecasting that was otherwise infeasible due to resource limitations.

In an embodiment and by way of example, a method is provided for selecting a synchronous or asynchronous process to determine a forecast. The method embodiment includes identifying at least one user for which a forecast is to be determined. Further, one of a plurality of processes is selected for determining the forecast. Such processes include a synchronous process and an asynchronous process. To this end, the forecast is determined, utilizing the selected process.

While the present invention is described with reference to an embodiment in which techniques for selecting a synchronous or asynchronous process to determine a forecast are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are pr vided for selecting a synchronous or asynchronous process to determine a forecast.

Database systems often store large amounts of data that can be used for, among other things, the determination of a forecast. One example of a forecast is a sales forecast that indicates a predication of an amount of sales a salesperson will have in a given amount of time. To date, such forecasts have been determined only for a single person over a predetermined time interval. To this end, the amount of data involved in forecasting has been constrained.

Any attempt to do otherwise would require the processing of a larger amount of data that may be difficult for various database systems. Thus, mechanisms and methods for selecting a synchronous or asynchronous process to determine a forecast will be described with reference to example embodiments. As will soon become apparent, selective use of such synchronous or asynchronous process enables increased forecast-related processing involving larger amounts of data.

Figure 1:
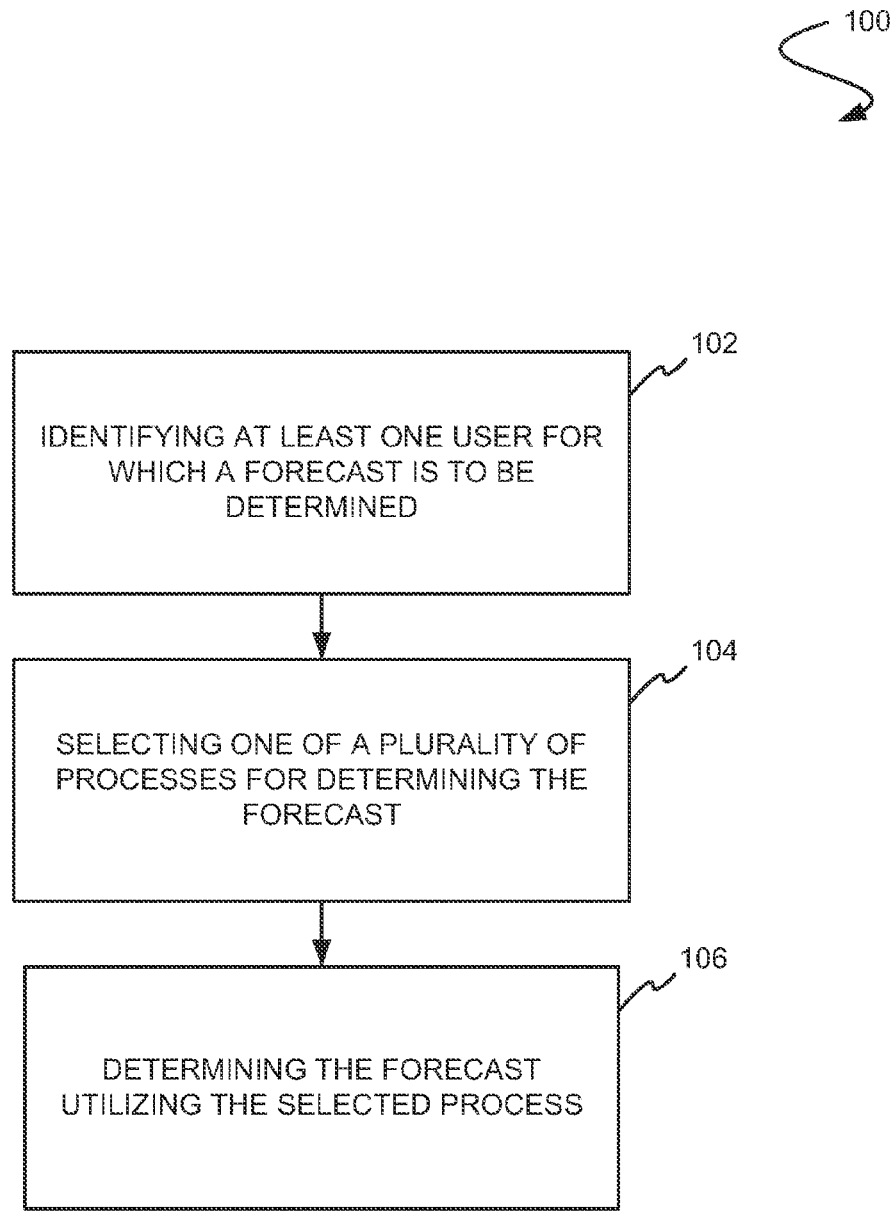
FIG. 1 illustrates a method for selecting a synchronous or asynchronous process to determine a forecast, in accordance with one embodiment.

FIG. 1 illustrates a method 100 for selecting a synchronous or asynchronous process to determine a forecast, in accordance with one embodiment. As an option, the aforementioned synchronous or asynchronous processes may be performed on data stored in a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

As shown, at least one user is identified for which a forecast is to be determined. See operation 102. In the context of the present description, the forecast may include any prediction that requires the processing of data. Further, the at least one user may include any one or more persons or entities for which data is stored for forecasting purposes.

In one possible embodiment, the forecast may include a sales forecast. As an option, such sales forecast may involve the processing of data associated with a variety of deals that may potentially be closed, a timing of such closure, and/or any other data (e.g. historical data, forecasting parameters/criteria, etc.). In various embodiments, the forecast may even involve a plurality of the users and/or may involve any arbitrary manually or automatically selected time period. Further, such users may even have a hierarchical relationship (e.g. one user may be a manager of one or more other users, etc.). Of course, other types of forecasts are contemplated including, but not limited to planning forecasts, routing/transportation forecasts, material requirements forecasts, manufacturing-related forecasts, spending forecasts, budget forecasts, scheduling forecasts, and/or any other forecast that meets the foregoing definition.

With continuing reference to FIG. 1, one of a plurality of processes is selected for determining the forecast, as indicated in operation 104. While such processes may or may not include other processes, they, at the very least, include a synchronous process and an asynchronous process. In the context of the present description, the synchronous process may include any process that is performed in real-time, near-real time, or at least in less time than the aforementioned asynchronous process. Conversely, the asynchronous process may include batch processing or any other process that is performed in a greater amount of time with respect to the synchronous process.

In various embodiments, the process may be selected utilizing any desired predetermined or user-configurable criteria. More information regarding various exemplary criterion will be set forth later during the description of different embodiments illustrated in subsequent figures.

To this end, the forecast may be determined using the selected process. See operation 106. By selecting the appropriate process, any increase in required processing (e.g. due to additional data, etc.) may be managed effectively.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
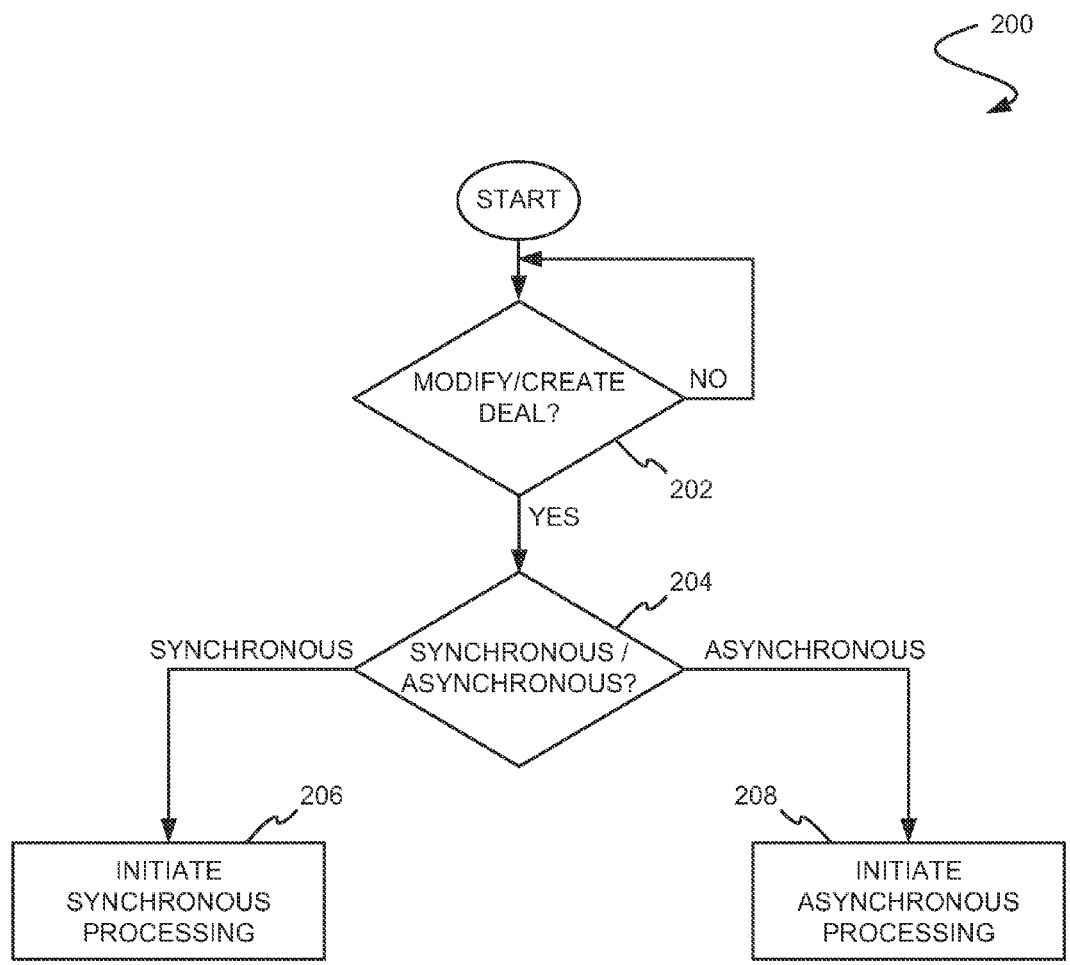
FIG. 2 shows a method for selecting a synchronous or asynchronous process to determine a forecast, in accordance with another embodiment.

FIG. 2 shows a method 200 for selecting a synchronous or asynchronous process to determine a forecast, in accordance with another embodiment. As an option, the present method 200 may be used to implement the method 100 of FIG. 1, for example. Of course, however, the method 200 may be carried out in any desired environment. It should also be noted that the aforementioned definitions may apply during the present description.

In decision 202, it is first determined whether a deal has been created or modified. In the present embodiment, such deal may include any agreement, contract, and/or lead (e.g. possible deal, etc.) that has at least a potential of affecting a related forecast. If it is determined that a deal has been created or modified, it may thus be assumed that additional processing is necessary to determine what, if any, affect such event has on the related forecast.

If this is the case, the method 200 proceeds by determining whether a synchronous or asynchronous process is appropriate to perform the forecast-related processing. See decision 204. While a choice between only a synchronous or asynchronous process is shown in FIG. 2, it should be noted that other embodiments are contemplated involving the selection of a synchronous/asynchronous hybrid process whereby a first portion of relevant data is synchronously processed and a second portion of relevant data is asynchronously processed.

As mentioned earlier, such decision 204 may be based on any desired criteria. In one embodiment, the decision 204 may be made by determining whether a modification to the deal involves data events or set-up functions. In the present embodiment, the data events may involve any events that only affect the data which is to be the subject of forecast-related processing. Such data events may involve the addition, removal, modification, etc. of data that may potentially affect the forecast.

For example, in one possible database environment (e.g. an on-demand database service, etc.), users may be able to enter and/or modify transaction amounts and estimates for deals, etc. As such, each user may have the ability to adjust their forecast based on current estimates. This may be done either at a transaction level (e.g. by estimating a final amount of a transaction or a date when the transaction closes, etc.), or at an individual level by estimating a personal total forecast or a forecast that is expected to roll up from one or more subordinate users.

In one embodiment, any of the foregoing forecast modifications may be made utilizing a graphical user interface, for example. Of course, other embodiments are contemplated that involve the modification of forecast data in an automated manner. In any case, such modification may thus prompt a need for any relevant forecast to be determined for updating purposes, etc., in manner that makes the newly determined forecast available as soon as possible.

On the other hand, the aforementioned set-up functions may include various metadata that is used to categorize, describe, etc. the data. Non-exhaustive examples of such metadata include, but are limited to a time or time period when the data event occurred, a hierarchy of users associated with the data event, forecasting criteria, etc. For example, in one possible database environment (e.g. the aforementioned on-demand database service, etc.), users may be able to define a reporting structure, customize time intervals from which a forecast may be calculated, etc. Any creation or modification of metadata (e.g. parameters, etc.) associated with such reporting functions may thus prompt recalculation of any relevant forecast, etc. However, unlike the modifications involving data events, the present set-up function changes may not necessarily require that the forecast be determined as fast (e.g. in real-time, near real-time, etc.).

Thus, in an effort to minimize an impact of forecast calculation that results from the foregoing modifications, tradeoffs may be balanced between providing a timely up-to-date forecast, and managing load on the system. For example, in one possible embodiment, any modification to the data events may only result in synchronous processing. See operation 206. Since data events are less likely to require a sizable increase in processing resources, such synchronous processing may be appropriate for providing forecasting results faster (and without necessarily resulting in processing resource shortages). More information regarding one exemplary synchronous process will be set forth in greater detail during the description of a different embodiment illustrated in FIG. 3.

Further, any modification to the set-up functions (e.g. or associated metadata) may result in asynchronous processing. See operation 208. Since modifications to such set-up functions are more likely to require a sizable increase in processing resources, such asynchronous processing may be more appropriate for providing forecasting results. While such asynchronous processing may result in delayed forecasting results, it may also lessen the chance of any ill effects of resource shortages. More information regarding one exemplary asynchronous process will be set forth in greater detail during the description of a different embodiment illustrated in FIG. 5.

While not shown, each event that affects a forecast may be stored in a queue along with any contextual information that describes such event (e.g. information describing any modifications to metadata, etc.). Events may also be ordered according to a time of occurrence. Events that involve data modifications (e.g. transaction inserts and updates, estimations, etc.) may cause forecasts to be recalculated synchronously (e.g. right away). On the other hand, events that involve metadata changes (e.g. forecast hierarchy changes, forecast period settings, forecast dimension settings, etc.) may be queued up and processed asynchronously. These operations may result in a high load situation, and may thus affect application performance and usability, if processed synchronously.

Other than the benefit of performing high load operations asynchronously, the aforementioned event queue may also allow for intelligent optimizations. For example, certain events may render other preceding events redundant and therefore reduce the total amount of work needed to recalculate at least a portion of the (or all of the) affected forecasts.

More information regarding such optimization will be set forth hereinafter in greater detail during the description of different embodiments.

Figure 3:
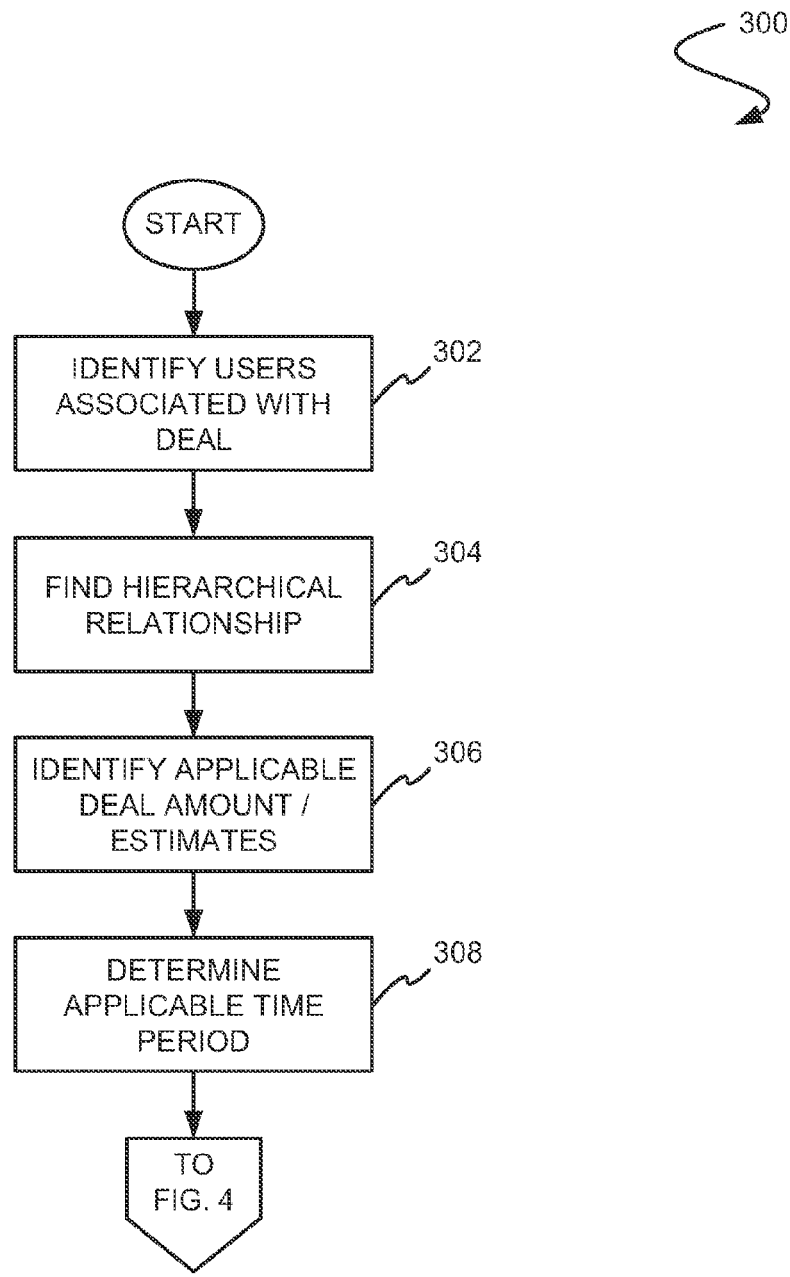
FIGS. 3 and 4 show a method for a synchronous process to determine a forecast, in accordance with another embodiment.

FIG. 3 shows a method 300 for a synchronous process to determine a forecast, in accordance with another embodiment. As an option, the present s method 300 may be used to carry out operation 206 of FIG. 2, for example. Of course, however, the method 300 may be carried out in any desired environment. It should also be noted that the aforementioned definitions may apply during the present description.

As shown, a user associated with a deal may be identified, as indicated in operation 302. In one embodiment, such deal may include that which is determined to be created and/or modified in decision 202 of FIG. 2. Further, such identified user may, for example, include the person most personally responsible or connected to such deal. In one embodiment, each deal (and stored associated data) may include a field that identifies such user, allowing for the identification thereof.

Further, in operation 304, a hierarchy associated with the user (if any) is identified. Table 1 illustrates an exemplary hierarchy that may be stored in association with the user. As shown, the current hierarchy takes the form of a list. Of course, such list hierarchy is set forth for illustrative purposes only and should not be construed as limiting in any manner whatsoever. For example, other tree-based hierarchies, hierarchies with three or more levels, etc. are also contemplated.

TABLE 1

| |
| --- |
| User_1 |
|     User_2 |
|     User_3 |
|     User_4 |
|     User_5 |
| User_2 |
|     User_1 |
|     User_5 |
|     User_6 |
|     User_7 |

As an option, the hierarchical list may even be user-defined. For example, a hierarchy list of other users may be entered in a field or selected from an all-inclusive list, etc. Similar to the user, the hierarchy may be stored in association with the deal and thus be conveniently found, as desired. Using the foregoing hierarchy, a group of users may be identified including the user (see operation 302) as well as the other additional users associated with such user (as indicated by the hierarchy of operation 304). In one embodiment, the foregoing hierarchy may represent metadata and thus be processed as such.

To this end, an applicable deal amount or estimate may be identified for not only the user identified in operation 302, but also the other additional users associated with such user (as indicated by the hierarchy of operation 304). Note operation 306. In other words, data on the pending deals of each of the users may be identified. For example, the user identified in operation 302 may be a manager responsible for the sales of a plurality of additional users (see hierarchy of operation 304) who are salespeople. Thus, the pending deal amounts/estimates of each of the salespeople may be relevant to the manager, and thus be collected.

Still yet, in operation 308, an applicable time period is determined. Such time period may be user-configured. For instance, the time period may be defined as any arbitrary time period, as desired by the person who is configuring the forecasting. In one embodiment, the time period may be selected by selecting a predetermined quarter or period, or simply entering an applicable start and end date.

In any case, the data reflecting deal amounts/estimates that are applicable over the time period identified in operation 308 may be determined in single operation (e.g. the effect of each of a plurality of deal amounts/estimates may be determined in parallel).

Figure 4:
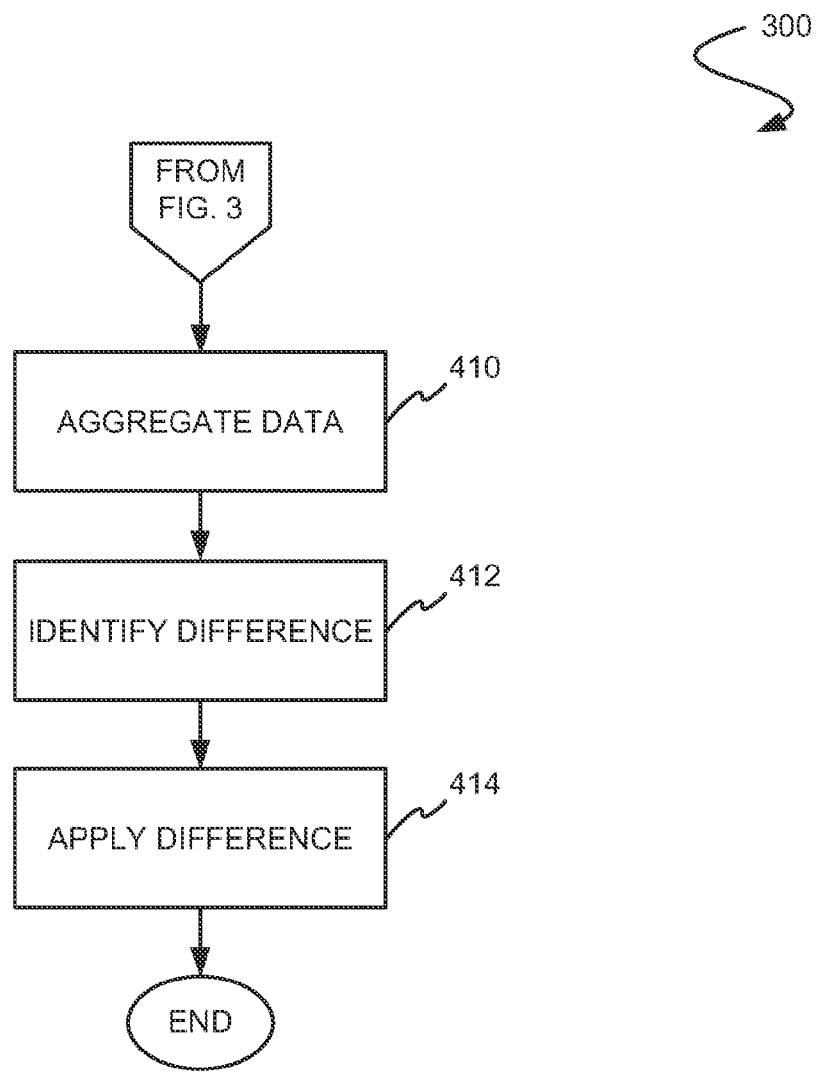

Next, as shown in FIG. 4, the deal amounts/estimates identified in operation 308 may be aggregated. See operation 410. Specifically, a first forecast associated with the user may be identified, a second forecast associated with at least one additional user may be identified, and so on, so that each of such forecasts may be aggregated.

Further, in operation 412, such aggregation is compared to a previous forecast to identify a difference amount. Such difference amount may be positive or negative. To this end, such different amount may be applied to the previous forecast to determine an updated forecast. See operation 414. Thus, if the synchronous process is selected, the forecast is determined by identifying a forecast difference amount, and applying the forecast difference amount to a previous forecast amount.

By applying such difference to the previous instance of forecasting (without necessarily recalculating the forecast from scratch), the synchronous method 300 is less likely to require a sizable increase in processing resources, and may thus provide forecasting results faster (and without necessarily resulting in processing resource shortages). Further, the forecasting may be based on a variety of factors such as the aforementioned hierarchy and associated users, arbitrary time period, as well as others.

For instance, while not shown, the forecast may take into account a level of commitment. Some non-limiting examples of various levels of commit include, but are not limited to a committed level (e.g. indicating that a customer has committed, etc.), a best case level (e.g. indicating that a deal has the best chances of closing, etc.), an omitted level (e.g. indicating that a deal has been omitted, etc.), a closed level (e.g. indicating that a deal has been closed, etc.), and a pipeline level (e.g. indicating that a deal is pending, etc.). In one embodiment, such levels of commitment may be entered by each user in association with any forecast(s). Further, depending on a specific configuration, certain forecast amounts/estimates may or may not be included in a forecasting calculation based on the level of commitment (e.g. using a user-configured commitment level threshold, etc.).

Figure 5:
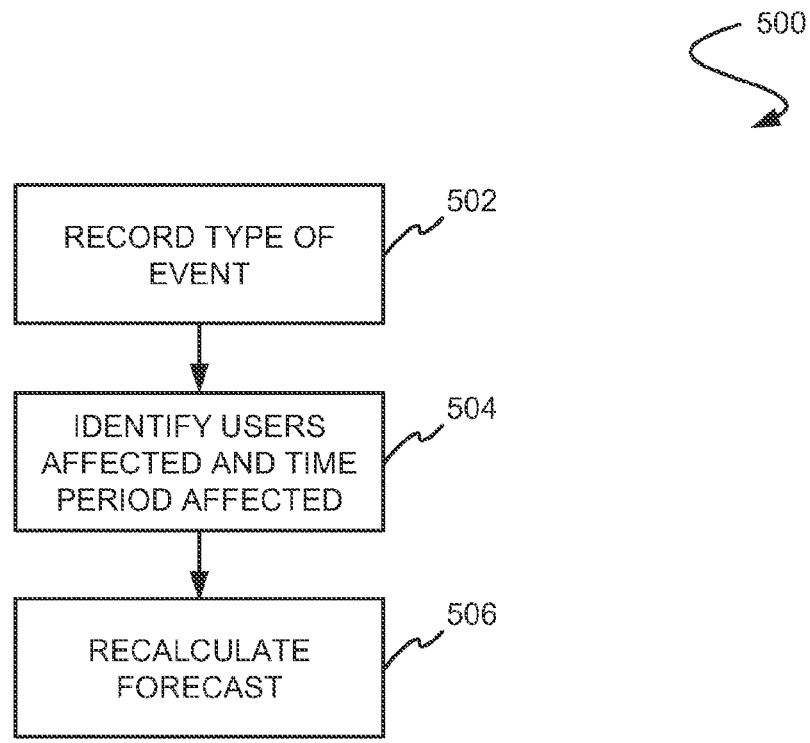
FIG. 5 shows a method for an asynchronous process to determine a forecast, in accordance with another embodiment.

FIG. 5 shows a method 500 for an asynchronous process to determine a forecast, in accordance with another embodiment. As an option, the present method 500 may be used to carry out operation 208 of FIG. 2, for example. Of course, however, the method 500 may be carried out in any desired environment. Again, the aforementioned definitions may apply during the present description.

As shown, a type of event that resulted in a deal being modified or created (e.g. see decision 202 of FIG. 2) may first be identified. See operation 502. For example, the event may involve the modification of any metadata, etc.

In operation 504, any users and time period affected by such event are identified. Armed with such information, the forecast may then be recalculated for the users and time period identified in operation 504. See operation 506. To this end, the forecast may be determined based on at least one identified event, where such event occurred subsequent to the determination of a previous forecast.

For efficiency purposes, the forecast may, in one embodiment, be determined by only recalculating one or more previous forecasts that are impacted by the at least one event. As mentioned earlier, each forecast may depend on a vast amount of data (e.g. metadata reflecting a hierarchy, a period and other settings, etc.). Events may thus be processed efficiently by maintaining each forecast as a set of contributing forecasts. This technique may make it possible to isolate an effect of certain events to only those portions of the model to which they are relevant. Thus, total forecasts may be recalculated in an efficient manner, by avoiding a complete recalculation of the entire forecast each time.

In another optional embodiment, a group of events may be evaluated prior to engaging in the forecast recalculation of operation 506 of FIG. 5. For example, operations 502-504 of the method 500 may be repeated by identifying at least one additional event that occurred. For further efficiencies, it may be determined whether a previous event is subsumed by the additional event. In the present embodiment, such previous event may be subsumed by the additional event, if an impact of the additional event on any relevant forecast renders the impact of the previous event moot. To this end, the forecast may be recalculated based on only the additional event, if it is determined that the event is subsumed by the additional event. In other words, the operation 506 may not necessarily be performed for the previous event, thus preserving resources.

System Overview

Figure 6:
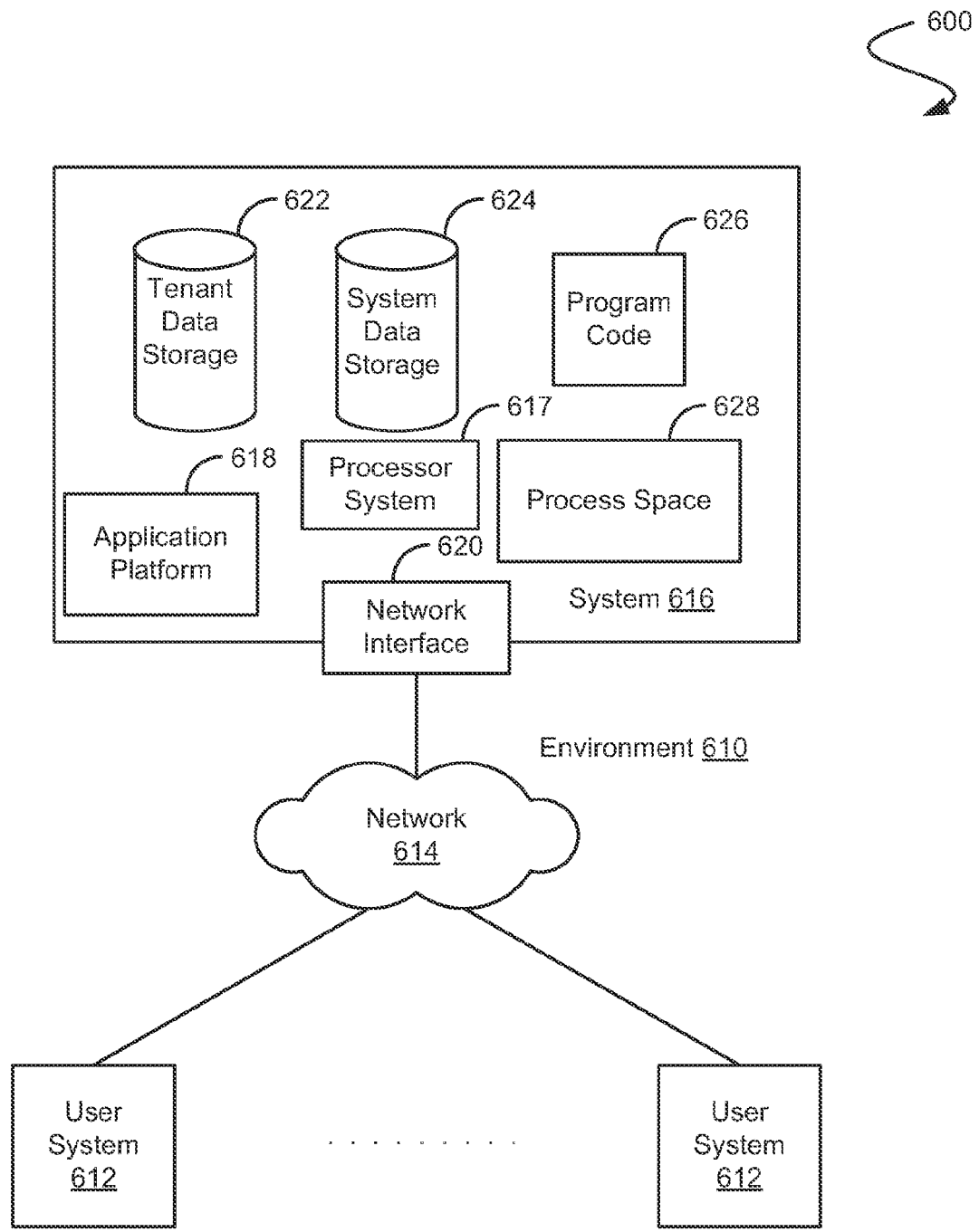
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610.

Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to lain, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a mufti-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
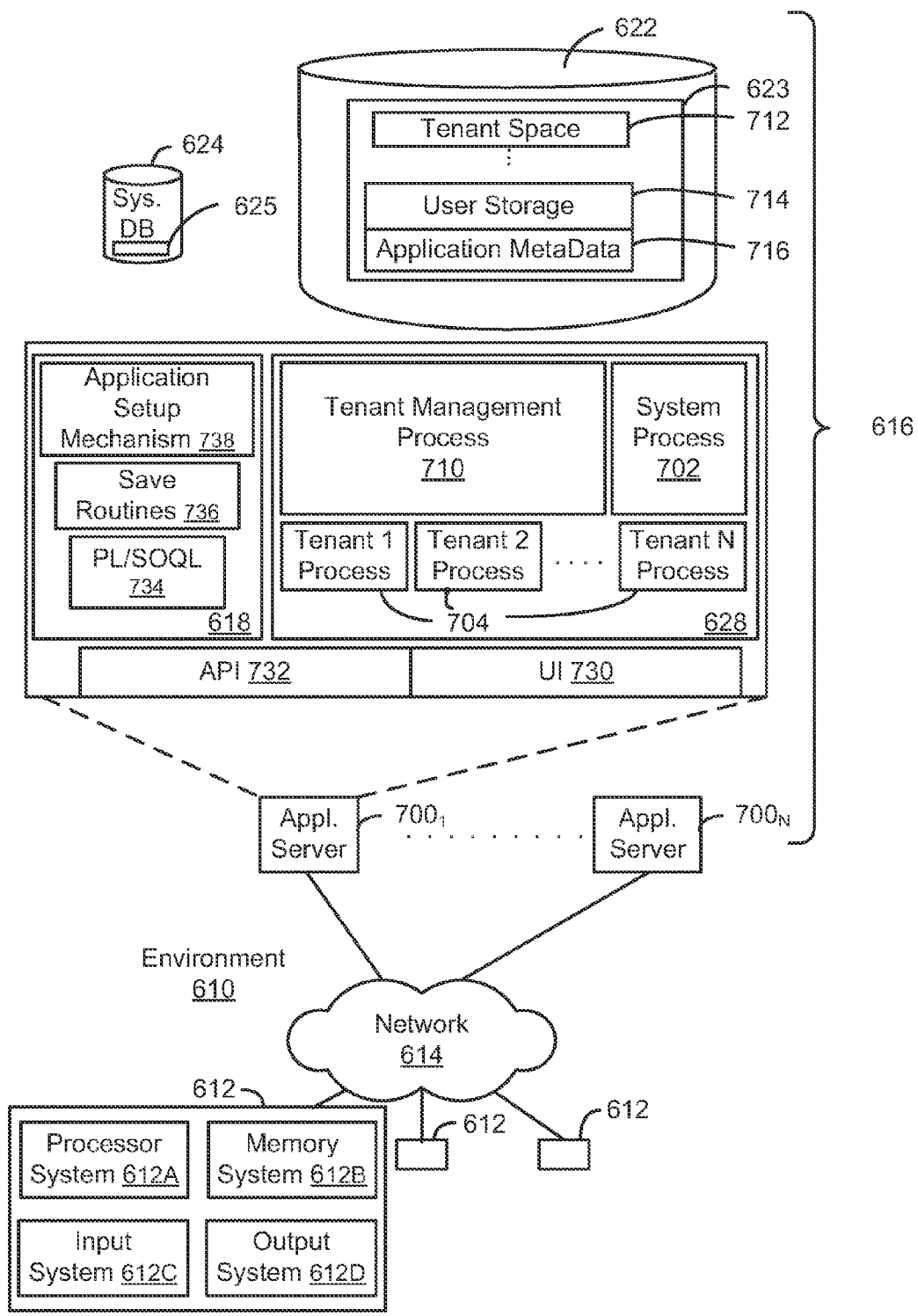
FIG. 7 illustrates a block diagram of an embodiment of elements of FIG. 6 and various possible interconnections between these elements.

One arrangement for elements of system 616 is shown in FIG. 7, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an IMP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an NITS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated, FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   identifying at least one user associated with at least one deal for which a sales forecast is determined;
   identifying data of the at least one user utilized to determine the sales forecast;
   identifying a type of at least one event associated with a modification to the identified data and affecting the sales forecast;
   managing load on a forecast system utilized to determine the sales forecast, by automatically selecting between a synchronous process and an asynchronous process for determining the sales forecast, by a processor, based on the identified type of the at least one event, including:
   automatically selecting the synchronous process in response to a determination that the type of the at least one event is a data event that affects data which is a subject of the determination of the sales forecast, the data event including a modification to the data, such that the sales forecast is adjusted based on current data resulting from the modification to the data; and automatically selecting the asynchronous process in response to a determination that the type of the at least one event is a set-up function event;
determining the sales forecast from the identified data of the at least one user, utilizing the selected one of the synchronous process and the asynchronous process;
wherein the synchronous process is performed in less time than the asynchronous process, and wherein the synchronous process is performed in real-time or near-real time and the asynchronous process includes batch processing that is performed in a greater amount of time with respect to the synchronous process, such that the synchronous process is selected to determine the sales forecast faster than would the asynchronous process.

2. The method of claim 1, and further comprising identifying a hierarchy associated with the user.

3. The method of claim 2, wherein the sales forecast is determined, based on the hierarchy.

4. The method of claim 2, wherein the hierarchy is user-defined.

5. The method of claim 1, and further comprising identifying at least one additional user associated with the user.

6. The method of claim 5, wherein the sales forecast is determined, based on the at least one additional user.

7. The method of claim 6, wherein a plurality of additional users are included in a list associated with the user.

8. The method of claim 7, wherein the list is user-defined.

9. The method of claim 6, wherein the determination is made by identifying a first sales forecast associated with the user and a second sales forecast associated with the at least one additional user, and aggregating the first sales forecast and the second sales forecast.

10. The method of claim 1, and further comprising identifying an arbitrary time period.

11. The method of claim 10, wherein the sales forecast is determined, based on the arbitrary time period.

12. The method of claim 1, and further comprising identifying a level of commitment.

13. The method of claim 12, wherein the sales forecast is determined, based on the level of commitment.

14. The method of claim 12, wherein the level of commitment includes at least one of a committed level, a best case level, an omitted level, a closed level, and a pipeline level.

15. The method of claim 1, and further comprising identifying the at least one event.

16. The method of claim 15, wherein the sales forecast is determined, based on the at least one event.

17. The method of claim 16, wherein the sales forecast is determined by only recalculating one or more previous sales forecasts that are affected by the at least one event.

18. The method of claim 15, and further comprising identifying at least one additional event.

19. The method of claim 18, and further comprising determining whether the at least one event is subsumed by the at least one additional event.

20. The method of claim 19, wherein the sales forecast is determined based on only the at least one additional event, if it is determined that the at least one event is subsumed by the at least one additional event, and the sales forecast is determined based on the at least one event and the at least one additional event if it is determined that the at least one event is not subsumed by the at least one additional event.

21. The method of claim 1, wherein, in response to the selection of the synchronous process, the sales forecast is determined by identifying a forecast difference amount, and applying the forecast difference amount to a previous forecast amount, and in response to the selection of the asynchronous process, the sales forecast is determined by only recalculating one or more previous sales forecasts that are impacted by the at least one event.

22. The method of claim 1, wherein the data is stored in a multi-tenant database system.

23. A machine-readable medium carrying one or more sequences of instructions which, when executed by one or more processors, cause the one or more processors to carry out the steps of:
identifying at least one user associated with at least one deal for which a sales forecast is determined;
identifying data of the at least one user utilized to determine the sales forecast;
identifying a type of at least one event associated with a modification to the identified data and affecting the sales forecast;
managing load on a forecast system utilized to determine the sales forecast, by automatically selecting between a synchronous process and an asynchronous process for determining the sales forecast, based on the identified type of the at least one event, including:
automatically selecting the synchronous process in response to a determination that the type of the at least one event is a data event that affects data which is to be a subject of the determination of the sales forecast, the data event including a modification to the data, such that the sales forecast is adjusted based on current data resulting from the modification to the data; and
automatically selecting the asynchronous process in response to a determination that the type of the at least one event is a set-up function event;
determining the sales forecast from the identified data of the at least one user, utilizing the selected one of the synchronous process and the asynchronous process;
wherein the synchronous process is performed in less time than the asynchronous process, and wherein the synchronous process is performed in real-time or near-real time and the asynchronous process includes batch processing that is performed in a greater amount of time with respect to the synchronous process, such that the synchronous process is selected to determine the sales forecast faster than would the asynchronous process.

24. An apparatus, comprising:
a processor; and
one or more stored sequences of instructions which, when executed the processor, cause the processor to carry out the steps of:
identifying at least one user associated with at least one deal for which a sales forecast is determined;
identifying data of the at least one user utilized to determine the sales forecast;
identifying a type of at least one event associated with a modification to the identified data and affecting the sales forecast;
managing load on a forecast system utilized to determine the sales forecast, by automatically selecting between a synchronous process and an asynchronous process for determining the sales forecast, based on the identified type of the at least one event, including:
automatically selecting the synchronous process in response to a determination that the type of the at least one event is a data event that affects data which is to be a subject of the determination of the sales forecast, the data event including a modification to the data, such that the sales forecast is adjusted based on current data resulting from the modification to the data; and automatically selecting the asynchronous process in response to a determination that the type of the at least one event is a set-up function event;
determining the sales forecast from the identified data of the at least one user, utilizing the selected one of the synchronous process and the asynchronous process;
wherein the synchronous process is performed in less time than the asynchronous process, and wherein the synchronous process is performed in real-time or near-real time and the asynchronous process includes batch processing that is performed in a greater amount of time with respect to the synchronous process, such that the synchronous process is selected to determine the sales forecast faster than would the asynchronous process.

* * * * *

UNITED STATES PATENT AND TRADEMARK OFFICE
CERTIFICATE OF CORRECTION

PATENT NO. : 8,326,675 B2
APPLICATION NO. : 13/353265
DATED : December 4, 2012
INVENTOR(S) : Doshi et al.

Page 1 of 1

It is certified that error appears in the above-identified patent and that said Letters Patent is hereby corrected as shown below:

In the claims:
Claim 24, col. 16, line 46; please replace "executed the" with --executed by the--.

Signed and Sealed this
Twelfth Day of March, 2013

Teresa Stanek Rea
*Acting Director of the United States Patent and Trademark Office*